Nov. 9, 1926.
J. P. LEWIS
1,606,247
CRANK SHAFT TRUING DEVICE
Filed May 14, 1925
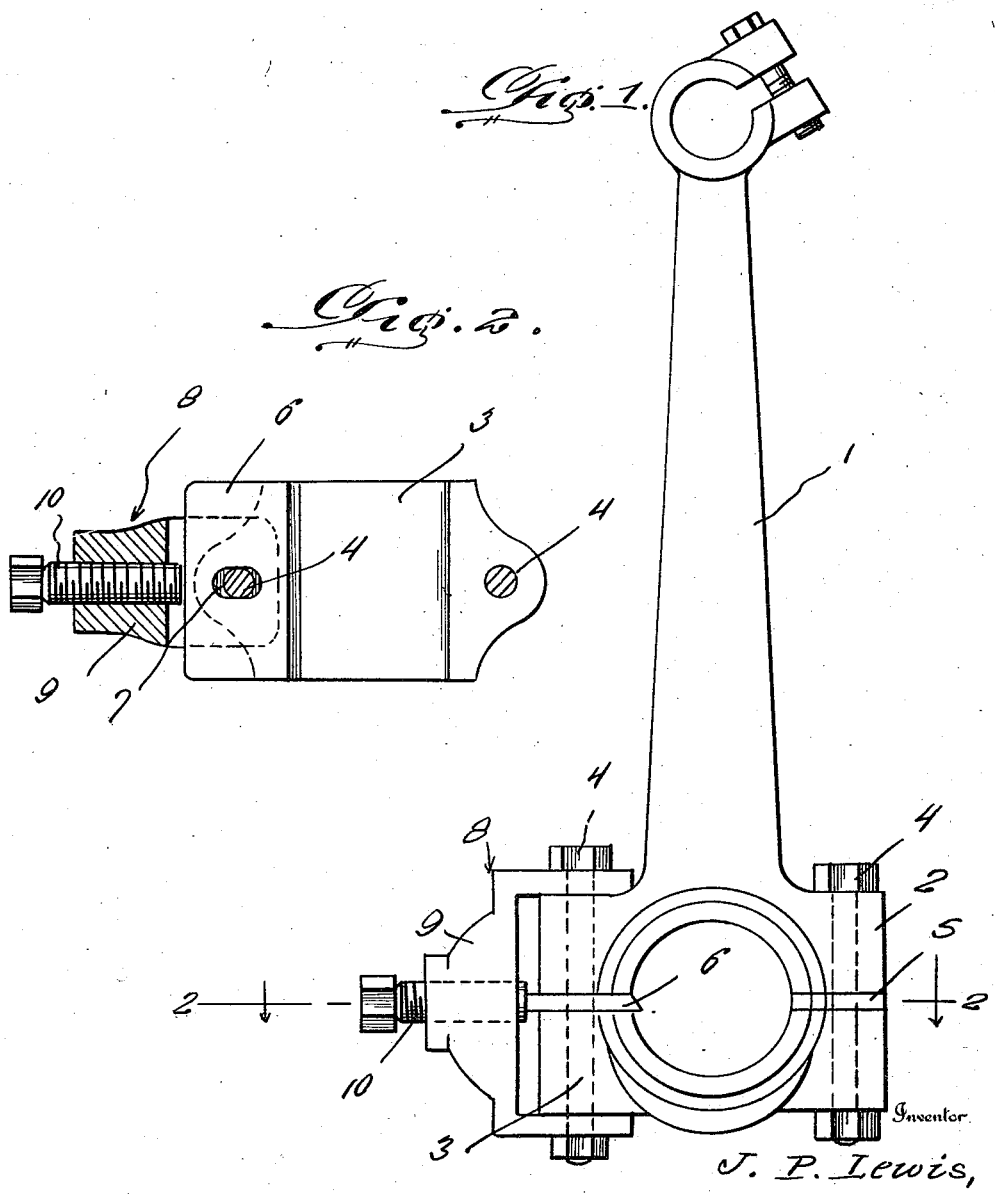

Patented Nov. 9, 1926.

1,606,247

UNITED STATES PATENT OFFICE.

JAMES PATRICK LEWIS, OF HOWARD, KANSAS.

CRANK-SHAFT-TRUING DEVICE.

Application filed May 14, 1925. Serial No. 30,323.

This invention relates to an improved device for truing crank shafts, pins, and equivalent elements.

The invention has been designed with a view toward providing a means for permitting the cranks of a crank shaft to be relieved of flat sided portions and to render them truly concentric for effective rotation in their bearings, and the object is to provide a means which is capable of permanent association with a crank shaft connecting rod so that the shaft may be trued with the least possible effort.

I am well aware of the fact that the broad proposition of providing a cutting tool for association with the bearing of a connecting rod, and the portion of the crank rotatable therein is not new, and I therefore do not claim this broad arrangement of parts.

The present invention relies for its distinctiveness and novelty upon the provision of a structure which is thought to be an outstanding improvement over known prior patented and marketed devices of this kind.

One feature of the invention is that it is exceedingly simple in construction, and therefore very inexpensive to both the manufacturer and the user.

Another feature is that it does not require the use of special bearing caps or the like, the same being attachable to the already marketed bearing of the connecting rod and serving in a much more efficient manner for efficiently truing the crank journaled in said bearing.

The particular details employed for accomplishing the improved result will become apparent from the following description and drawing.

In the accompanying drawing forming a part of this application and in which like numerals are employed to designate like parts throughout the same:

Figure 1 is a side view of a conventional connecting rod such as is used in connection with the Ford type of automobile, showing the improved shaft truing device associated with the bearing at the bottom thereof.

Figure 2 is a horizontal section taken approximately upon the plane of the line 2—2 of Figure 1.

Referring to the drawing in detail, the reference character 1 designates the usual connecting rod provided at its bottom with a head 2, forming one half of the usual bearing for the crank shaft (not shown). The removable reinforced bearing cap is represented by the reference character 3, and as is customary, is connected to the head 2 through the medium of removable bolts 4. Ordinarily wear compensating shims are arranged between the head and cap and in the present instance I take advantage of this arrangement and for one shim (at the right) I substitute a relatively thick shim 5. For the other shim I substitute a cutting blade 6 having a beveled inner end forming a cutting edge for cooperation with the surface of the crank shaft. From Figure 2 it will be noted that the blade is formed with an elongated central slot 7 which is adapted to accommodate the bolt 4 which passes therethrough. Cooperable with the blade is a yoke 8, the arms of which are adapted to straddle the bearing at the bottom of the connecting rod. More precisely, these arms are formed adjacent their free ends with openings and the bolt 4 extends through these openings and thus serves to connect the yoke to the head 2 and cap 3. The intermediate portion 9 of the yoke is enlarged somewhat and provided with a screw threaded bore through which a feed screw 10 is passed to abut the rear end of the blade 6.

The device may be installed and left in place with the connecting rod in operation, or it may be brought into play only when it is desired to true one of the crank portions. By preference it is left in place. If desired, a small portion of the cutting edge may be allowed to project after being fed inwardly by the fed screw 10. By tightening the cooperating clamping bolts 4, the cutter may be firmly held in the position to which it has been adjusted. It is obvious that this particular disposition of the cutter in place of the shims is of decided advantage. From time to time, the feed screw may be adjusted to move the cutter inwardly a slight fraction to be in the path of swing of any irregular portions in the crank. The provision of the supporting yoke is of decided advantage in that it properly positions the feed screw and disposes it at the center of the blade so that it will be fed inwardly in the proper alignment. If it is not desired to allow the cutter to project any distance, it may be pulled out and the bolt 4 tightened to hold it out. It will be noted that the ends of the cutting blade are such that they may be grasped by the fingers to permit the blade to be pulled out.

The foregoing, and other advantages and features of the invention have doubtless been made apparent by the description and drawing. Therefore, a more lengthy description is deemed unnecessary.

While the preferred embodiment of the invention has been shown and described it is to be understood that minor changes coming within the field of invention claimed may be resorted to if desired.

Having thus described the invention, what I claim as new and desire to secure by Letters Patent is:—

A crank shaft truing attachment comprising a U-shaped yoke having apertured arms to receive one of the connecting bolts of a bearing head and a cap and to rest at opposite sides of said head and cap, and also having a bight portion in which is a threaded bore in a plane in parallelism with the planes of the yoke arms, a cutting blade adapted to be interposed between a bearing cap and a head in the position ordinarily occupied by one or more shims, and a screw bearing in the said bore of the yoke and backing the said blade.

In testimony whereof I affix my signature.

JAMES PATRICK LEWIS.